(12) United States Patent
Chinn et al.

(10) Patent No.: US 7,239,642 B1
(45) Date of Patent: Jul. 3, 2007

(54) MULTI-PROTOCOL NETWORK INTERFACE CARD

(75) Inventors: Stephen R. Chinn, Alexandria, VA (US); Gene M. Ciancaglini, Dover, NH (US); Michael M. Garofalo, Portsmouth, NH (US); James A. Hart, Rochester, NH (US); Michael Lupinacci, Barrington, NH (US); Paul Marichal, Strafford, NH (US); John D. Moores, Concord, MA (US); Guy Oliveira, Dover, NH (US); Salil A. Parikh, Belmont, MA (US); Mark R. Parquette, Rye, NH (US); William Proulx, Sanbornville, NH (US); Donald Proulx, Dover, NH (US); Michael Rydeen, Portsmouth, NH (US)

(73) Assignee: Network Appliance, Inc., Sunnyvale, CA (US)

( * ) Notice: Subject to any disclaimer, the term of this patent is extended or adjusted under 35 U.S.C. 154(b) by 1023 days.

(21) Appl. No.: 10/196,336

(22) Filed: Jul. 16, 2002

Related U.S. Application Data

(60) Provisional application No. 60/306,651, filed on Jul. 18, 2001, provisional application No. 60/305,724, filed on Jul. 16, 2001.

(51) Int. Cl.
  *H04L 12/28* (2006.01)
(52) U.S. Cl. .................... 370/401; 370/419; 370/466
(58) Field of Classification Search .................... None
  See application file for complete search history.

(56) References Cited

U.S. PATENT DOCUMENTS

| | | | | |
|---|---|---|---|---|
| 6,076,115 A | * | 6/2000 | Sambamurthy et al. | 709/250 |
| 6,400,730 B1 | * | 6/2002 | Latif et al. | 370/466 |
| 6,985,956 B2 | * | 1/2006 | Luke et al. | 709/229 |
| 2003/0189935 A1 | | 10/2003 | Warden et al. | |

OTHER PUBLICATIONS

Eytan Modiano et al., "A Novel Medium Access Control Protocol for WDM-Based LAN's and Access Networks Using a Master/Slave Scheduler," Journal of Lightwave Technology, vol. 18, No. 4, pp. 461-468, Apr. 2000.

Mounir Hamid et al., "Scalable High-Speed Switches/Routers with QoS Support," IEEE Communications Magazine, pp. 61-69, Dec. 2000.

* cited by examiner

*Primary Examiner*—Frank Duong
(74) *Attorney, Agent, or Firm*—Blakely Sokoloff Taylor & Zafman LLP

(57) ABSTRACT

A method and apparatus for a communications network that executes a medium access control (MAC) protocol that permits multiple access to a shared medium or shared switching fabric. The MAC protocol uses a BAND-WIDTH_ALLOCATOR to regulate access to the network by sending a permission message to a NODE, allowing it to transmit to a specific set of NODEs for a specific length of time. The medium and switching fabric can carry one or more protocols, each of varying framing format and native bitrate. The switching fabric provides a connection-oriented bufferless data transport service that preserves frame ordering. An illustrative embodiment uses a slotted master/slave time-division multiplexed access (TDMA) scheme to allow flexible provisioning of network bandwidth.

17 Claims, 3 Drawing Sheets

MULTI-PROTOCOL NETWORK INTERFACE CARD

CROSS REFERENCE TO RELATED APPLICATIONS

This application claims the benefit of U.S. patent application Ser. No. 09/994,475 filed on Jan. 26, 2001 and also claims benefit of U.S. Provisional Patent Application Nos. 60/306,651, filed on Jul. 18, 2001, and 60/305,724 filed on Jul. 16, 2001 all of which are incorporated herein by reference in their entirety.

FIELD OF THE INVENTION

The invention relates to a multi-protocol computer network system. More particularly, the present invention relates to a multi-protocol network interface card included in each node of a plurality of nodes includes on the multi-protocol computer network system.

BACKGROUND OF THE INVENTION

A conventional connectionless switched communication system may be used to communicate information within a local area network ("LAN") and within a storage area network ("SAN"). The LAN can include a plurality of user nodes or computers (e.g. personal computers) coupled to a plurality of servers, via an Ethernet hub or an Ethernet switch. The SAN can include a plurality of mass storage systems and/or devices, such as disk drive systems, tape drive systems and/or optical storage systems, coupled to the plurality of servers, via a Fibre Channel switch for example.

In communicating information from the user nodes to the mass storage systems, the user nodes provide a plurality of data packets in an Ethernet format, which are subsequently received at the Ethernet switch, along with pertinent information related to the address of the destination server. The Ethernet switch buffers the incoming data packets and re-routes the data packet to the indicated server without prior knowledge of traffic patterns. The server receives the data packets from the user node and processes the data packets to reformat the data packets into a Fibre Channel format, which are used for communication with the SAN. The data packets are received at the Fibre Channel switch from the server. The Fibre Channel switch responds to receipt of the data packets by buffering the data packets and re-routing the data packets to the appropriate mass storage device to store the data packets.

Communicating information from the mass storage systems to the user computers is similar to that described above for communicating information from the user computers to the mass storage systems. More specifically, at least one of the mass storage systems can respond to a request for information received from one or more of the user computers by retrieving and packaging previously stored information into a plurality of data packets in a Fiber channel format. The data packets in the Fibre Channel format may be received and buffered at the Fibre Channel switch. Further, the Fibre Channel switch re-routes the data packets to the appropriate server, which is coupled to the user computer that requested the information. In this instance, the server receives the data packets in the Fibre Channel format from the Fibre Channel switch and processes the data packets to reformat the data packets into an Ethernet format, which is suitable for communication over the LAN. The data packets are thereafter received at the Ethernet switch, which again buffers the incoming data packets in the Ethernet format and re-routes the data packets to the user computer that requested the information without prior knowledge of the traffic patterns.

One problem may occur when a plurality of user nodes communicate a plurality of data packets to the Ethernet switch in random bursts, which can cause the buffer associated with the Ethernet switch to overflow. When the buffer of the Ethernet switch overflows, subsequently communicated data packets may be dropped or lost. Temporarily halting receipt of data packets in the Ethernet Switch until the buffer can be emptied avoids the problem of dropping or losing data, however, this approach significantly reduces system performance (e.g. by introducing undesirable latencies into the systems). The Fibre Channel switch can also experience similar problems related to buffer overflows as that described above with respect to the Ethernet switch.

It is not sufficient to simply increase the size of the buffer(s) to accommodate the data packets because this can result in long delays in moving the data packets in and out of the buffer, which also introduces system latencies and seriously degrades system performance. Further, large buffers may be costly and difficult to design in practice, especially for high-speed systems.

Another problem in the above-described conventional connectionless switched communication system is related to the significant overhead processing that is carried out by the servers to convert or re-format the data packets back and forth between the Ethernet format (e.g. suitable for communication over the LAN) and the Fibre Channel format (e.g. suitable for communication over the SAN). Further, system configurations that support both Ethernet and Fibre Channel data formats typically require specific hardware, as described above, for supporting each protocol or data format.

Therefore, an unsolved need remains for a data communication system that can support a plurality of protocols and reduce or eliminate the overhead processing that is carried out by the servers to convert or re-format the data packets back and forth between the Ethernet protocol and the Fibre Channel protocol.

SUMMARY OF THE INVENTION

In accordance with embodiments of the present invention, set forth is a multi-protocol network interface card (NIC) adapted for incorporation into at least a first node of a plurality of nodes. In one embodiment, the multi-protocol NIC includes a protocol specific logic circuit adapted to receive a plurality of instruction messages over an instruction data path. The protocol specific logic circuit is further adapted to receive and transmit a plurality of data packets in a plurality of data transfer formats over a data path.

The multi-protocol NIC further includes a first protocol controller coupled to the protocol specific logic circuit and a second protocol controller coupled to the protocol specific logic circuit. The protocol specific logic circuit is operative to process the plurality of data packets in the plurality of data transfer formats by defining at least a first predetermined data packet of the plurality of data packets in a first data transfer format of the plurality of data transfer formats. Further, the protocol specific logic circuit communicates the first predetermined data packet in the first data transfer format to the first protocol controller. Similarly, the protocol specific logic circuit is operative to process the plurality of data packets in the plurality of data transfer formats by defining at least a second predetermined data packet of the plurality of data packets in a second data transfer format of the plurality of data transfer formats. Furthermore, the protocol specific logic circuit communicates the second predetermined data packet in the second data transfer format to the second protocol controller.

The multi-protocol network interface card further includes a bridge control circuit coupled to the first protocol controller, the second protocol controller and to the protocol specific logic circuit. The bridge control circuit is adapted to receive a plurality of control signals from the protocol specific logic circuit to control the bridge control circuit to couple the first protocol controller to a host processor to permit the first protocol controller to communicate the first predetermined data packet in the first data transfer format to the host processor. In addition, the bridge control circuit is adapted to receive a plurality of control signals from the protocol specific logic circuit to control the bridge control circuit to couple the second protocol controller to the host processor to permit the second protocol controller to communicate the second predetermined data packet in the second data transfer format to the host processor.

The multi-protocol network interface card further including a receive memory coupled to the protocol specific logic circuit. The receive memory is adapted to receive the plurality of data packets in the plurality of data transfer formats from the protocol specific logic circuit at a first data rate. The receive memory is further adapted to communicate the plurality of data packets in the plurality of data transfer formats back to the protocol specific logic circuit at a second data rate. In an embodiment, the receive memory includes a first-in-first-out (FIFO) register.

The multi-protocol network interface card further including a transmit memory coupled to the protocol specific logic circuit. The transmit memory is adapted to transmit the plurality of data packets in the plurality of data transfer formats to the protocol specific logic circuit. In an embodiment, the transmit memory includes one or more dynamic-random-access-memory (DRAM) integrated circuits.

The protocol specific logic circuit further includes a data receive section. The data receive section includes a data receive interface coupled to a data receive controller. The data receive controller is adapted to receive at least the first predetermined data packet in the first data transfer format and at least the second predetermined data packet in the second data transfer format from the data receive interface. The data receive section further includes a first protocol transmit interface coupled to the data receive controller. The first protocol transmit interface is adapted to receive at least the first predetermined data packet in the first data transfer format from the data receive controller. Furthermore, the data receive section includes a second protocol transmit interface coupled to the data receive controller. The second protocol transmit interface is adapted to receive at least the second predetermined data packet in the second data transfer format from the data receive controller.

In one embodiment, the first data transfer format includes a Fibre Channel data transfer format. In another embodiment, the second data transfer format includes a Gigabit Ethernet data transfer format.

The protocol specific logic circuit further comprises a data transmission section. The data transmission section includes a first protocol receive interface coupled to a connection mapper circuit. The connection mapper circuit is coupled to a buffer write control. The buffer write control is coupled to a data transmit controller. The data transmit controller is adapted to receive at least the first predetermined data packet in the first data transfer format, via the first protocol receive interface, the connection mapper and the buffer write control.

The data transmission section further includes a second protocol receive interface. The second protocol receive interface is coupled to the connection mapper circuit. In this arrangement, the transmit controller is adapted to receive at least the second predetermined data packet in the second data transfer format, via the second protocol receive interface, the connection mapper and the buffer write control.

Furthermore, the data transmission section further includes a buffer read control coupled to the data transmit controller. The buffer read control is coupled to a data transmit interface. The buffer read control is adapted to read at least the first predetermined data packet in the first data transfer format from the data transmit controller and to communicate the first predetermined data packet in the first data transfer format to the data transmit interface. Additionally, the buffer read control is adapted to read at least the second predetermined data packet in the second data transfer format from the data transmit controller and to communicate the second predetermined data packet in the second data transfer format to the data transmit interface.

The protocol specific logic circuit further includes a bandwidth-allocation-module (BAM) processor. The BAM processor is operative to receive at least a first instruction message of the plurality of instruction messages over the instruction data path and to process the first instruction message of the plurality of instruction messages by requesting at least the first predetermined data packet in the first data transfer format from the host processor. The BAM processor is also operative to schedule communication of the first predetermined data packet in the first data transfer format during a first predetermined time interval.

Similarly, the BAM processor is operative to receive at least a second instruction message of the plurality of instruction messages over the instruction data path and to process the second instruction message by requesting at least the second predetermined data packet in the second data transfer format from the host processor. The BAM processor is also operative to schedule communication of the second predetermined data packet in the second data transfer format during a second predetermined time interval.

BRIEF DESCRIPTION OF THE DRAWINGS

The foregoing and other objects of this invention, the various features thereof, as well as the invention itself, can be more fully understood from the following description, when read together with the accompanying drawings in which.

DETAILED DESCRIPTION OF THE INVENTION

Figure 1:
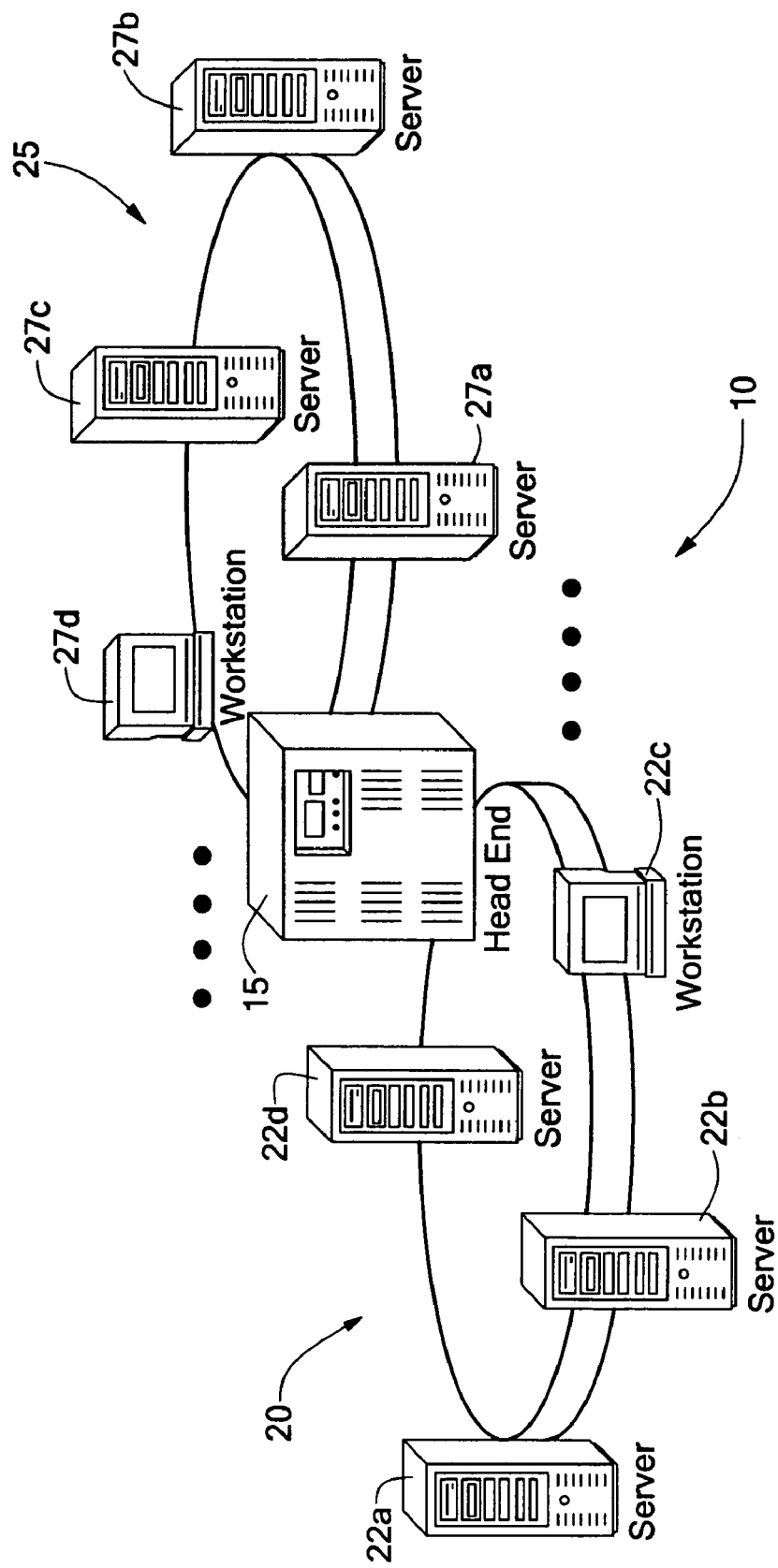
FIG. 1 is a block diagram of a multi-protocol computer network system having a plurality of node clusters, which each include a plurality of nodes.

Before referring to the figures describing the present invention, some introductory concepts and terminology are described. A method and apparatus for a communications network that illustrates the present invention is described.

Although the networking system is sometimes described herein in the particular context of a fiber-optic local-area network (LAN), it should be understood that the networking system can also be used in a metropolitan-area network (MAN), or a wide-area network (WAN), or a Passive Optical Network (PON), or a storage-area network (SAN). Furthermore, it should be understood that the transmission medium is not limited to fiber-optic transmission media (e.g. fiber optic) cables. Rather, non-optical transmission media (including wireless transmission media) may also be used. The optical networking system will be referred to as the ONS. The computers, processors or storage systems attached to the ONS will be referred to as "ONS nodes" or more simply "NODEs." It should be appreciated that use of the terms "node" or "nodes" in this document refers to any type of node (e.g. an optical node, a non-optical node, a node coupled to an optical network or a node coupled to a non-optical network).

The ONS includes a means of carrying multiple communication protocols, thereby eliminating the need for a separate network for each individual protocol. For example, the ONS can carry both Gigabit Ethernet (GbE) and Fibre Channel (FC) frames, thus eliminating the need for separate networks for data traffic (which typically uses GbE) and storage traffic (which typically uses FC). The ONS, in fact, can carry any number of protocols; it is only the NODE's multi-protocol network interface card (NIC) that determines which protocols are implemented. The NODE's multi-protocol NIC will be described in detail below in connection with FIGS. 1, 2 and 3, which illustrate embodiments of the present invention.

In general, the ONS includes a central switching fabric, called a HEADEND, which provides a provisioned circuit-oriented bufferless frame delivery switching system. This is in contrast to connectionless systems in which each intermediate switch in the path from "a source NODE" (or more simply "a source") to a destination NODE (or more simply a destination) must read and process each frame in order to properly direct the frame through the network. In the ONS, an end-to-end circuit path is pre-allocated for each group of frames destined for a common NODE, so that frames may be transported directly from transmitter to receiver (or multiple receivers in the case of a multicast transmission) without the need for any intermediate processing or buffering at the HEADEND. These circuit paths are established just-in-time for the transmission, and exist for the duration of the transmission before being reconfigured for the next set of transmissions. Unlike traditional circuit-oriented systems, the circuits in this system can have a lifetime as short as one frame.

The ONS uses a medium access control (MAC) protocol to permit multiple access to a shared medium and shared switching fabric. The MAC executes a process known as the "BANDWIDTH_ALLOCATOR" to regulate access to the network by sending a directive referred to herein as a bandwidth allocation message (BAM) to a NODE, allowing it to transmit to a specific set of destination NODEs for a specific length of time. The length of time, called a "TIMESLOT", indicates the boundaries of the transmission, not the internal framing format of the encapsulated frame.

The BAMs are sent over a control channel, distinguishable from the data-traffic bearing channel. Upon receiving the BAM, the NODE transmits frames to the indicated destination NODE(s), for all, or part, or even none of the permitted duration. Although the system can be designed to allow a varying bitrate within the timeslot, the embodiment of the invention detailed here uses a common bitrate for all encapsulated protocols. Protocols such as GbE and FC, which have different native bitrates, are transmitted at a higher common bitrate in the ONS. The ONS provides a connection-oriented bufferless switching fabric without frame reordering. In the embodiment here, the ONS uses a slotted master/slave time-division multiplexed access scheme to allow flexible provisioning of network bandwidth. Numerous models of Quality of Service can be supported by the ONS, including: Constant Bit Rate, Variable Bit Rate, and Isochronous services, as well as best effort service.

To improve the utilization of the network, the ONS performs a "ranging" procedure to determine the distance of each NODE from the HEADEND. Using this information, the BANDWIDTH_ALLOCATOR can take the distance (i.e., propagation times and variability) into account to allow more efficiently packed pipelined transmissions.

The switching fabric within the HEADEND is a crosspoint switch (or equivalent), which can map any input to any set of outputs. It should be understood that the switching fabric is not limited to a crosspoint switch implementation. The BANDWIDTH_ALLOCATOR reconfigures the crosspoint switch according to the BAM, so that frames arriving as a result of that BAM are directly routed to the correct destination without any intermediate buffering. The crosspoint switch in the HEADEND is a serial crosspoint, but a parallel crosspoint could also be used, and multiple crosspoints could be configured to form a switching fabric such as, but not limited to, a Clos, Benes, or Banyan network.

A notable aspect of the embodiment is that multiple NODEs can share a port on the crosspoint switch. The transmissions from a group of NODEs, called a "NODE_CLUSTER", share an input and output port of the crosspoint switch. In particular, the transmissions from the NODEs in a NODE_CLUSTER are optically and passively coupled together, allowing more NODEs to share the switching fabric, and provide the ability to partition system bandwidth among NODEs simply by the grouping of NODEs into a NODE_CLUSTER. If more bandwidth needs to be allocated to a particular NODE, it should share a crosspoint port with fewer NODEs.

In the embodiment discussed and detailed here, a HEADEND performs the following functions: (a) assigns each NODE a TIMESLOT by sending it a control message; (b) switches a transmission from a NODE through a switching fabric and delivers it to the receiving NODE (or multiple NODEs in the case of a multicast or broadcast transmission); (c) allows sharing of a crosspoint port by aggregating the transmissions from a group of NODEs and feeding them into one port; and (d) solicits feedback from the NODEs to dynamically change the transmission allocations in response to changing demands.

In the embodiment discussed and detailed here, a HEADEND has the following features: (a) it uses a wavelength division multiplexed (WDMed) control channel to carry the control messages to the NODEs; (b) it passively and optically combines transmissions from a group of NODEs; (c) it uses a serial crosspoint to switch frames between groups of NODEs; (d) it uses a burst-mode receiver at the inputs to the crosspoint switching fabric; (e) it uses a passive optical backplane, in addition to an electrical backplane, between system boards in the HEADEND; (e) it uses WDMed pilot tones to detect breaks in the fiber; and (f) it performs ranging to determine the locations of the NODEs and to increase performance of the network.

A medium access control (MAC) protocol, referred to herein as a transparent optical protocol-independent switching (TOPIX) protocol, allows the network to support simultaneous transmission of both GbE and FC traffic. The TOPIX protocol is capable of supporting an arbitrarily large number of protocols in the underlying traffic. However, both the HEADEND and NICs need to be protocol-aware. In one embodiment, the system supports GbE and FC. Those of ordinary skill in the art should appreciate, however, that other protocols can also be supported. The TOPIX protocol manages traffic amongst servers and storage devices without the complexity of the separate management and separate switches required in current LAN plus SAN architectures.

With respect to data transmission and collection, the TOPIX protocol utilizes a scheme similar to time division multiple access (TDMA) as the means for sharing bandwidth on the wavelength used for data traffic. TOPIX defines the timeslots that are utilized for data transmission, and those that are used for signaling (including such functions as autodiscovery and feedback). In one embodiment, a BANDWIDTH_ALLOCATOR sends BAMs from the HEADEND to all NODEs on the wavelength that is reserved for BAMs. BAMs provide information to NODEs as to when they can transmit data, for how long, and to whom. A single BAM has an overall framing structure surrounding a sequence of "mini-BAMs." Each mini-BAM is directed to a NODE on a NODE_CLUSTER. Each BAM contains only one mini-BAM for each NODE_CLUSTER in the network. This is to prevent collisions (two NODEs transmitting simultaneously on a NODE_CLUSTER). BAMs thus implement a MAC and maintain the order within the network.

Data frames in the network of the present invention are transmitted into empty unframed TIMESLOTS that are allocated by the centralized BANDWIDTH_ALLOCATOR at the HEADEND. Because the TIMESLOTS are not framed by the HEADEND, NODEs within the network can in principle transmit data in any format into these empty TIMESLOTS. In one embodiment, transmission is for GbE and FC protocols. The network is asynchronous in the sense that the NODEs need not share a global clock phase at the bit level. Data rates are nominally the same for all FC devices, and for all GbE devices throughout the network, but clock phase alignment is unnecessary.

There is a limit to how closely the BANDWIDTH_ALLOCATOR can arrange to pack data from different NODEs at different distances away from the crosspoint switch into adjacent TIMESLOTS. The bulk of the timing uncertainty is eliminated by "ranging," a process that is performed during auto-discovery, and periodically during network operation. Ranging is a process by which the HEADEND determines the relative delays associated with the different NODEs on the network. This is done by measuring the difference in time between when the HEADEND sends out a BAM to a particular NODE until the time the data frame sent by that NODE in response to that BAM arrives at the crosspoint switch. The NODEs will incur different delays primarily as a function of where in the BAM the piece intended for the NODE (the "mini-BAM") lies.

Once this information is obtained, the BANDWIDTH_ALLOCATOR can determine the longest delay in the network, and can then distribute to each NODE the difference between the maximum delay and that particular NODE's delay. The NODE can then store this delay. During network operation, the NODE will wait after receiving a BAM for this specified delay interval before sending out its data frame. This way the BANDWIDTH_ALLOCATOR does not have to vary the BAMs to accommodate the different delays in the system.

Ranging resolves the most macroscopic timing issue, greatly increasing network efficiency. However, there are other timing considerations that dictate the use of gaps between transmissions on a NODE_CLUSTER. The first of these is uncertainty in the ranging, and the fact that in a network operating in accordance with the present invention, the fiber is a shared medium, shared by different sources (NODEs). In order to accommodate this timing uncertainty (i.e., the probability that data from different NODEs may overlap), part of each time slice is left "blank" to create a "GUARDBAND". The presence of this GUARDBAND gives the network of the present invention data streams a "bursty" character not present in today's SANs and LANs, but which is a property of passive optical networks (PONs).

Furthermore, the different sources on a NODE_CLUSTER have different link losses to the HEADEND, so that the transmissions from different sources not only have gaps between them, but the transmissions arrive at the HEADEND with different optical power levels. This makes the transmitter and receiver hardware design more challenging because the high-bandwidth transceivers commercially available today are not equipped to deal with the fast-on/fast-off requirements of this kind of data. Furthermore, transceivers normally used for continuous transmission applications may have crosstalk issues during gaps. Lack of a global clock reference creates a need for rapid clock recovery.

The TOPIX framing of data is a preamble comprised of a fixed length pattern (e.g. 101010 . . . ) preceding the transmitted frame. This preamble is used for clock acquisition at receivers, and is necessary because of the asynchronous bit-level nature of the traffic (no global bit clock phase) and the dark gaps between transmissions.

Furthermore, a destination address, obtained from the mini-BAM, is prepended to each data frame. In some embodiments, it is useful to include the entire mini-BAM (or a subset of the fields of the mini-BAM) in the preamble. Depending upon the clock recovery devices, there may also be a postamble added to each frame to maintain clock synchronization throughout a frame.

Because all routing is pre-established, a TOPIX network is inherently connection-oriented. This is in contrast to the current connectionless switched architectures used in conventional LANs and SANs.

The internal processing required in the network of the present invention is less complicated than that of a typical LAN or SAN. The BANDWIDTH_ALLOCATOR gathers requests from the NODEs in the network, measures traffic on the network and builds a traffic model, measures propagation times between NODEs and the HEADEND switch, applies filtering and prioritization to maintain QoS guarantees, is aware of the processing limitations of receivers, and is aware of the throughput implications of grouping traffic by source and destination NODE pairs and protocol ("connections"). Given all of this information, the BANDWIDTH_ALLOCATOR decides how best the requests can be fulfilled and sends out BAMs to indicate to the appropriate NODEs when to transmit or receive data. The BANDWIDTH_ALLOCATOR also calculates when to reconfigure the SWITCH_BLADE in the HEADEND.

A simple embodiment of the BANDWIDTH_ALLOCATOR allocates fixed TIMESLOTS in a round-robin manner. In other words, the BANDWIDTH_ALLOCATOR polls the devices on the network and allocates different fractions of the available bandwidth to the different NODEs. Ideally, the BANDWIDTH_ALLOCATOR updates its traffic model to dynamically reallocate resources as needed.

Referring now to FIG. 1, a system 10 for bufferless data communications includes a HEADEND controller 15 coupled to one or more groups of NODEs or NODE_CLUSTERs, for example, the first NODE_CLUSTER 20 and the second NODE_CLUSTER 25. The first NODE_CLUSTER 20 includes one or more NODEs, such as the NODEs 22a, 22b, 22c and 22d, which are hereinafter collectively referred to as "NODEs 22." Furthermore, the second NODE_CLUSTER 25 also includes one or more NODEs, such as the NODEs 27a, 27b, 27c and 27d, which are hereinafter collectively referred to as "NODEs 27."

In this arrangement, the HEADEND controller 15 communicates with one or more of the NODEs 22, which are located on the first NODE_CLUSTER 20 to execute data communications between two or more NODEs 22 located on the first NODE_CLUSTER 20 (e.g. intra-NODE_CLUSTER communications) or between a NODEs 22 and the HEADEND controller 15. Similarly, the HEADEND controller 15 communicates with one or more of the NODEs 27, which are located on the second NODE_CLUSTER 25 to execute data communications between two or more NODEs 27 located on the second NODE_CLUSTER 20 or between a NODEs 27 and the HEADEND controller 15. In addition, the HEADEND controller 15 can communicate with one or more of the NODEs 22 and/or 27, which are respectively located on the first 20 and second 25 NODE_CLUSTERs to execute data communications between NODEs 22 and 27 located on the first 20 and second 25 NODE_CLUSTERs (e.g. inter-NODE_CLUSTER communications).

In one embodiment, the plurality of NODEs 22 and/or 27, which are respectively located on the first 20 and second 25 NODE_CLUSTERs can include a number of data processing systems, such as servers, workstations and/or personal computers. Furthermore, the plurality of NODEs 22 and/or 27 can also include a number of data storage systems, such as disk drive systems, tape drive systems, optical storage systems, magneto-optical storage systems and/or solid state storage systems. The HEADEND controller 15 and NODEs 22, 27 operate in accordance with a protocol of the type described in co-pending application Ser. No. 09/994,475, filed on Jan. 26, 2001.

Figure 2:
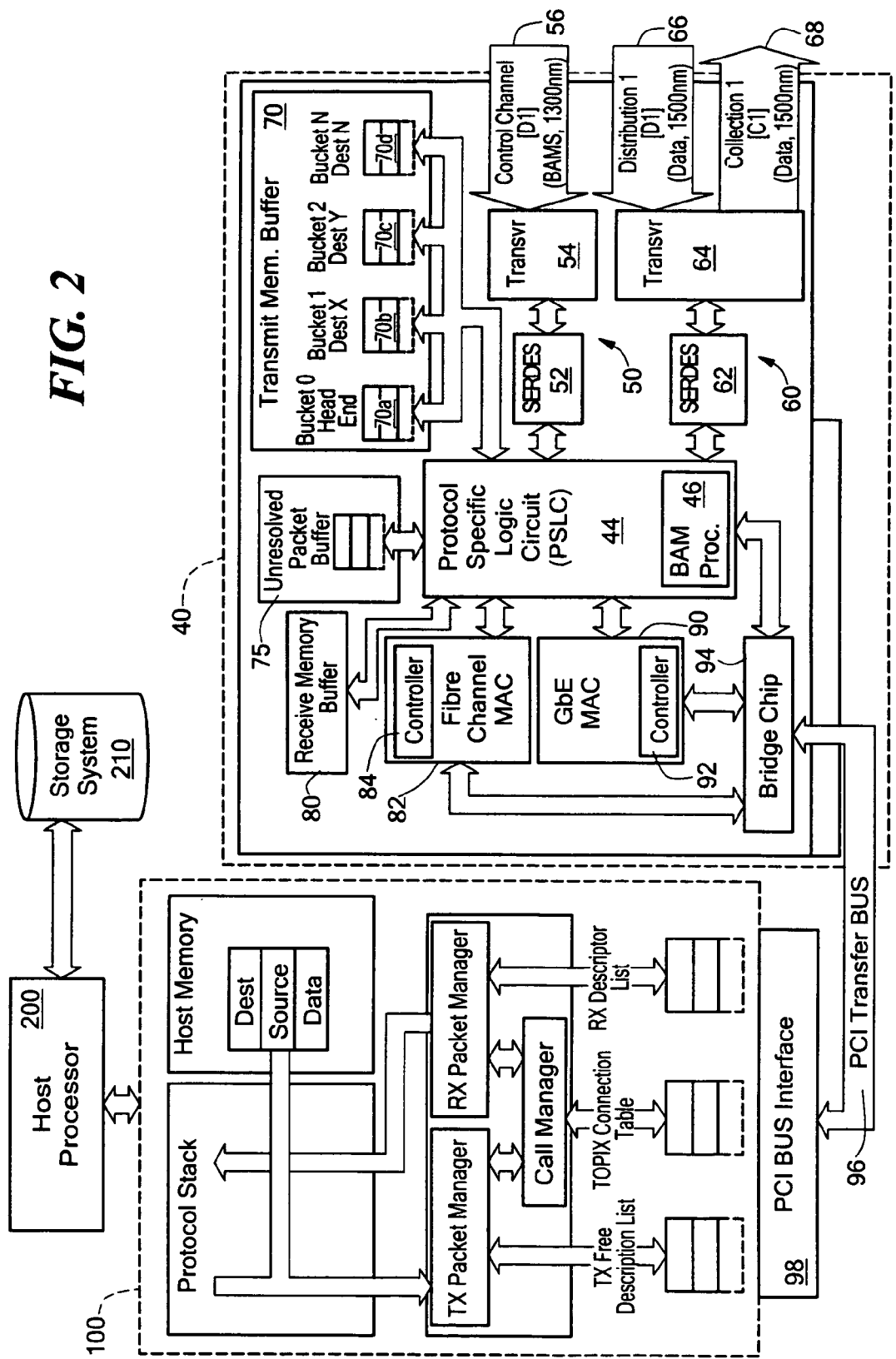
FIG. 2 is a detailed block diagram of a multi-protocol network interface card included in each of the plurality of nodes of the system of FIG. 1.

Referring to FIG. 2, in accordance with principles of the present invention, the plurality of NODEs 22 and/or 27, (FIG. 1) which are respectively located on the first 20 and second 25 NODE_CLUSTERs, (FIG. 1) can each include a multi-protocol NIC 40. The multi-protocol NIC 40 includes a protocol specific logic (PSLC) circuit 44, which is operative to interact with multiple data transfer protocols or formats. In one embodiment, the protocol specific logic unit 44 is operative to interact with GbE and FC data transfer protocols or formats. The protocol specific logic unit 44 includes a BAM processor 46, which will be described in detail below. In one embodiment the PLSC 44 is implemented as a filed programmable gade array (FPGA). In other embodiments, the PLSC 44 can be implemented as application specific integrated circuit (ASIC).

The multi-protocol NIC 40 further includes a control path 50 and user a path 60 (e.g. data packets path). The control data path 50 includes a first serial-to-parallel decoder 52 (e.g. first SERDES), which couples to the PSLC 44 to a first transceiver 54. The first transceiver 54 includes a control channel input port 56 adapted to receive a plurality of BAMs from the headend controller 15 (FIG. 1). The first transceiver 54 communicates the plurality of BAMS to the BAM processor 46 via the first SERDES 52. The BAM processor 46 processes the plurality of BAMs by communicating a predetermined number of data packets for a predetermined duration from the transmit memory buffer 70 (described below) to one or more of the NODEs 22 and/or 27, which are respectively located on the NODE_CLUSTERs 20 and 25. Further details of the BAM processor 46 will be described in detail below in connection with FIG. 3.

The data path 60, as described above, includes a second serial-to-parallel decoder 62 (e.g. second SERDES), which couples to the PSLC 44 to a second transceiver 64. The second transceiver 64 includes a data distribution input port 66 that is adapted to receive a plurality of data packets from one or more NODEs 22 and/or 27, which are respectively coupled to the first 20 and second 25 NODE_CLUSTERs. After receiving the plurality of data packets at the second transceiver 64, as described above, the second transceiver 64 communicates the plurality of data packets to the PSLC 44, via the second SERDES 62. Furthermore, the second transceiver 64 includes a data collection output port 68 adapted to transmit a plurality of data packets to one or more of the NODEs 22 and/or 27 that are respectively coupled to the first 20 and second 25 NODE_CLUSTERs. In this arrangement, the second transceiver 64 may receive the plurality of data packets from the PSLC 44, via the second SERDES 62, and subsequently communicate the plurality of data packets from the data collection port 68 of the second transceiver 64, as described above. In one exemplary embodiment, the second transceiver 64 is controlled to communicate a predetermined number of the plurality of data packets from data collection output port 68 for a predetermined duration or during a predetermined time interval (e.g. TIMESLOT), as specified in at least one BAM of the plurality of BAMs received at the FPGA 42 over the control data path 50, as described above.

The multi-protocol NIC 40 further includes the transmit memory buffer 70, an unresolved memory buffer 75 and a receive memory buffer 80, all of which are coupled to the PSLC 42. The transmit memory buffer 70 may include one or more solid state storage devices 70a, 70b, 70c and 70d. In one embodiment, the solid state storage devices 70a, 70b, 70c, and 70d may each include one or more of a static-dynamic-random-access memory (SDRAM) and/or a dynamic-random-access memory (DRAM). In other embodiments, the transmit memory buffer may include other storage devices, such as a micro-magnetic storage device (not shown) or other nonvolatile and/or volatile storage devices.

The transmit memory buffer 70 is adapted to receive and store a plurality of data packets, which are received from the PSLC 44. In response to an appropriate BAM, one ore more of the plurality of data packets are transferred from the transmit memory to the PSLC 44. The plurality of data packets stored in the transmit memory buffer 70 may be arranged into a plurality of groups of data packets, which are scheduled to be communicated to one or more predetermined node 22 and/or 27 located on respective NODE_CLUSTERs 20 and 25. Further, the plurality of groups of data packets may be scheduled to be communication to the one or more NODEs 22 and/or 27 during a future time internal, which is represented as a predetermined TIMESLOT. Each of the plurality of groups of data packets can include one or more data packets and it should be understood that the number of data packets included in each of the groups of data packets may vary from group to group.

The unresolved memory buffer 75 may be similarly constructed and arranged as the transmit memory buffer 70, as described above. The unresolved memory buffer 75 is adapted to receive and store a plurality of data packets, which are received from the PSLC 44. Data packets are stored in the buffer 75 when they have not been assigned to one of the buckets 70a–70d. Once the headend controller 15 schedules a time at which the data in the buffer 75 can be transmitted, the data in the buffer 75 is moved to one of the appropriate one of the buckets 70a–70b. That is, the plurality of data packets stored in the unresolved memory buffer 75 are not yet scheduled to be communicated to a particular NODE 22 and/or 27 during a particular time interval or TIMESLOT. These data packets remain in the unresolved memory buffer 75 until a BAM is received. The BAM provides instruction information to the FPGA 42, which is related to the address of the particular NODE 22 and/or 27 for which the data packets should be communicated, as well as a time interval or TIMESLOT for the communication. The PSLC 44 responds to receipt of the BAM, including the aforementioned instruct information, by moving the data packets from the unresolved memory 75 to the transmit memory buffer 70 and by scheduling the data packets for communication to one or more NODEs 22 and/or 27 during the time interval or TIMESLOT prescribed in the BAM.

The receive memory buffer 80 may also be similarly constructed and arranged as the transmit buffer memory 70, as described above. The receive memory buffer 80 is adapted to receive and buffer a plurality of data packets sent from the PSLC 44 at a first data rate and to send plurality of data packets back to the PSLC 44 at a second data rate, in a first-in-first-out manner. Thus, the receive memory buffer 80 may be controlled to spool-up the plurality of data packets at the fist data rate, which are received from the FPGA 42, and communicate the plurality of data packets back to the FPGA 42 at a second data rate in a first-in-first-out (FIFO) manner. In this arrangement, a plurality of data packets can be received at the PSLC 44 over the data path 60 at varying first data rates are provided to the receive memory buffer 75, which as described above, spools-up the plurality of data packets at the varying first data rate and communicates the plurality of data packets back to the PSLC 44 at the second data rate. In one exemplary embodiment, the second data rate is fixed at a predetermined rate, which is compatible with other various components of the multi-protocol NIC 40, which are described in detail below.

A Fibre Channel Medium Access Control circuit 82 (hereinafter "FC MAC") and a Gigabit Ethernet Medium Access Control circuit 90 (hereinafter "GbE MAC") are both coupled to the PSLC 44. The FC MAC 82 includes an FC controller 84 adapted to receive a plurality of data packets from the PSLC 44, which are formulated in an FC data transfer format. The FC MAC 82 forwards the plurality of data packets in the FC data transfer format to the host processor 200, via a bridge circuit 94, PCI transfer bus 96, PCI bus Interface 98 and device driver section 100 (e.g. software protocol). The host processor 200 receives and processes the plurality of data packets in the FC data transfer format. Thereafter, the host processor 200 stores the plurality of data packets in the FC data transfer format in the non-volatile data storage system 210. In an embodiment, the non-volatile data storage system 210 can include one or more of a disk drive system, tape drive system, optical storage system or magneto-optical storage system. In other embodiments, the host processor 200 may store the plurality of data packets in the FC data transfer format in a remote storage system (not shown).

The controller 84 located on the FC MAC 82 is further adapted to receive the plurality of data packets in the FC data transfer format, which were formerly stored in the data storage system 210. In this instance, the host processor 200 retrieves the plurality of data packets in the FC data transfer format and forwards the data packets to the FC MAC, via the device driver section 100, the PCI bus Interface 98, the PCI transfer bus 96 and the bridge circuit 94. The FC MAC 82 further forwards the plurality of data packets in the FC data transfer format to the FPGA 47, which subsequently stores the data packets in either the transmit memory buffer 70 (e.g. communication of data packets to a predetermined NODE 22 and/or 27 during a predetermined time interval is scheduled) or in the unresolved packet buffer 75 (e.g. communication of data packets to a predetermined NODE 22 and/or 27 during a predetermined time interval is not scheduled and/or known).

The GbE MAC 90 is similarly constructed and arranged as the FC MAC 82 and includes a GbE controller 92. The GbE controller 92 is also adapted to receive a plurality of data packets from the FPGA 42, but which are formulated in a GbE data transfer format. The GbE MAC 90 forwards the plurality of data packets in the GbE data transfer format to the host processor 200, via the bridge circuit 94, the PCI transfer bus 96, the PCI bus Interface 98 and the device driver section 100. The host processor 200 receives and processes the plurality of data packets in the GbE data transfer format. Thereafter, the host processor 200 stores the plurality of data packets in the GbE data transfer format in the non-volatile data storage system 210. In other embodiments, the host processor 200 may store the plurality of data packets in the GbE data transfer format in a remote storage system (not shown).

The controller 92 located on the GbE MAC 90 is further adapted to receive the plurality of data packets in the GbE data transfer format, which were formerly stored in the data storage system. In this instance, the host processor 200 retrieves the plurality of data packets in the GbE data transfer format and forwards the data packets to the GbE MAC 92, via the device driver section 100, the PCI bus Interface 98, the PCI transfer bus 96 and the bridge circuit 94. The GbE MAC 90 further forwards the plurality of data packets in the GbE data transfer format to the FPGA 42, which subsequently stores the data packets in either the transmit memory buffer 70 or in the unresolved packet buffer 75, in a similar manner as described above with respect to storing the data packets in the FC data format.

Figure 3:
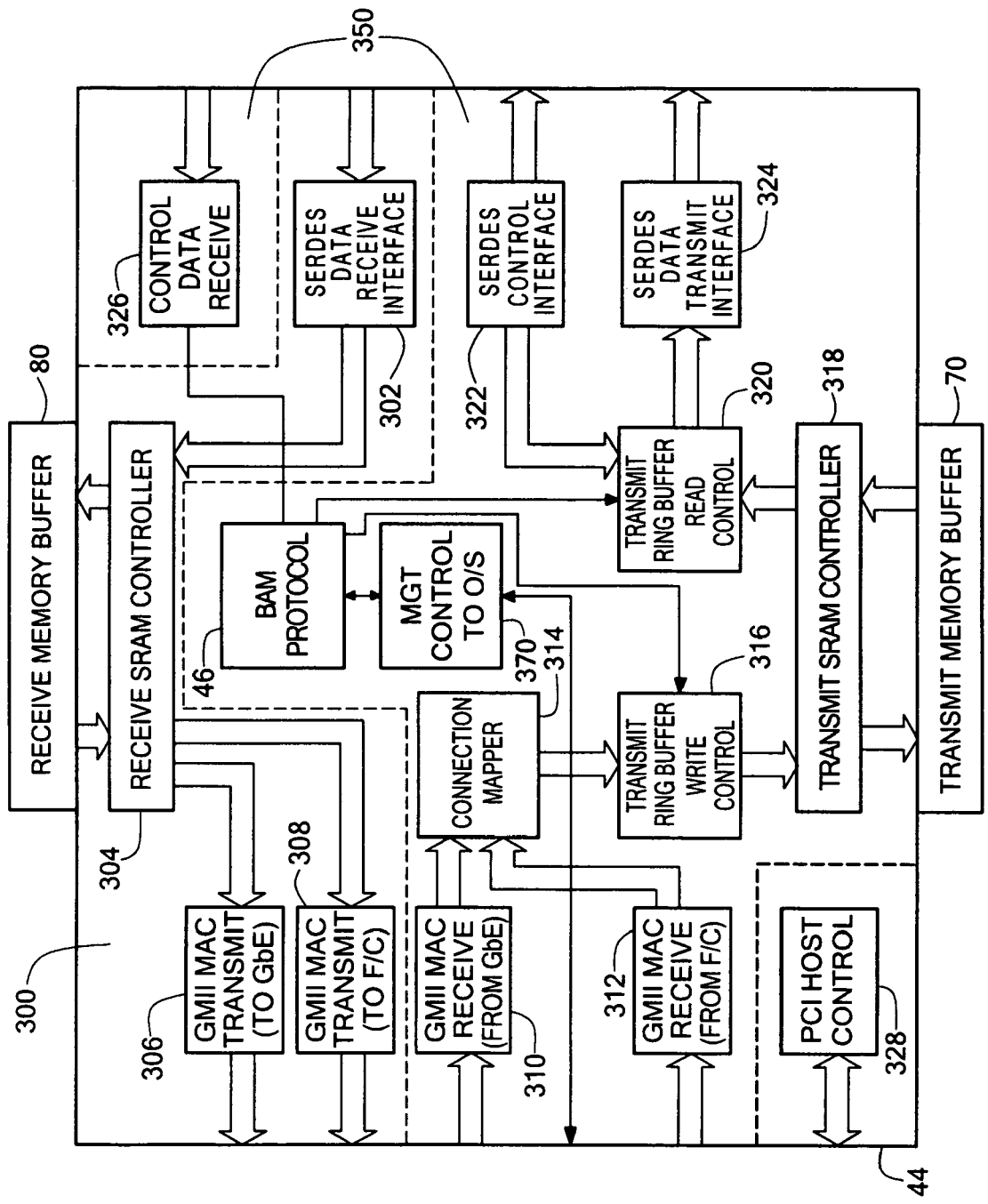
FIG. 3 is an expanded block diagram of a portion of the multi-protocol network interface card of FIG. 2.

Referring to FIG. 3, in which like elements of FIG. 2 are provided having like reference designations, the PSLC 44 includes a receive data packet section 300 and a transmit data packet section 350.

The receive data packet section 300 includes a data receive interface 302 adapted to receive data from SERDES 62 (FIG. 2) disposed in the data path 60 (FIG. 2). Interface 302 couples data to an input of a receive static-random-access-memory (SRAM) controller 304. Controller 304 couples data to and receives data from receive buffer memory 80. The interaction between the controller 304 and receive buffer memory 80 will be explained further below. In one embodiment, the receive memory buffer 80 can include a FIFO register. Outputs of the receive SRAM controller 304 are coupled to respective ones of a GbE MAC transmission interface 306 and an FC MAC transmission interface 308.

In receive mode operation, the PSLC 44 receives at the data receive interface 302 one or more data packets from one or more of the NODEs 22 and/or 27 (FIG. 1). The nodes transmit the data packets via the data path 60 (FIG. 1). The data receive interface 302 couples the data packets to the receive SRAM controller 304.

Since the plurality of data packets may be received at the receive SRAM controller 302 at varying data rates, including data rates which exceed the rate at which the receive path of PLSC 44 can process the data, the SRAM controller 302 provides the plurality of data packets to the receive memory buffer 80. The receive memory buffer 80 thus acts as a buffer in which data received at the PLSC 44 can be stored. In one embodiment, the data is stored in the receive memory buffer 80 at a predetermined data rate. The predetermined data rate may include, for example, the varying data rates.

The receive SRAM controller 302 also receives the plurality of data packets back from the receive memory buffer 80 at a second data rate. The data rate at which the controller 304 receives data from the buffer 80 can correspond to a variable or a fixed data rate. The particular data rate used in any particular application is selected such that the data is provided from PLSC 44 via transmit circuits 306, 308 at a rates suitable for communication to other various components for which the data is intended.

The receive SRAM controller 304 is operative to determine whether the plurality of data packets, which are received at the second data rate from the receive memory buffer, are in a GbE data transfer format or an FC data transfer format. If the receive SRAM 304 controller determines that the plurality of data packets are in the GbE date transfer format, the receive SRAM controller 304 forwards the plurality of data packets in the GbE data transfer format to the GbE MAC transmission interface 306. The GbE MAC transmission interface 306 couples the plurality of data packets in the GbE data transfer format to the GbE MAC 90 (FIG. 2). Thereafter, the plurality of data packets in the GbE data transfer format may be communicated to the host processor 200 for subsequent storage in the storage system 210, as described in detail above.

On the other hand, if the receive SRAM controller 304 determines that the plurality of data packets are in the FC data transfer format, the receive SRAM controller 304 forwards the plurality of data packets in the FC data transfer format to the FC MAC transmission interface 308. The FC MAC transmission interface 308 couples the plurality of data packets in the FC data transfer format to the FC MAC 82 (FIG. 2). Thereafter, the plurality of data packets in the FC data transfer format may be communicated to the host processor 200 for subsequent storage in the storage system 210, which is also described in detail above.

The transmit data packet section 350 includes a GbE MAC receive interface 310 and an FC MAC receive interface 312, both of which are coupled to a connection mapper circuit 314. The interfaces 310, 312 are respectively coupled to the GbE MAC 90 (FIG. 2) and the FC MAC 82 (FIG. 2).

The connection mapper 314 receives signals from the interfaces 310, 312 and couples the signals to a transmit ring buffer write control circuit 316. A signal path also couples signals from the BAM processor 46 to the write control circuit 316. An output of the transmit ring buffer write control circuit 316 is also coupled to the transmit memory buffer 70 (FIG. 2).

Transmit controller 318 couples data to and receives data from the transmit memory buffer memory 70 for reasons which will become apparent from the description below. An output of the transmit controller 318 is coupled to a transmit ring buffer read control circuit 320. A signal path couples the BAM processor 46 to the transmit ring buffer read control circuit 320.

A control interface circuit 322 couples the transmit ring buffer read control circuit 320 to the SERDES 62 (FIG. 2) disposed in the user data path 60 (FIG. 2). In this manner, control signals are coupled between the SERDES 62 disposed in the user data path 60 and the transmit ring buffer read control circuit 320.

Similarly, a data transmit interface 324 couples the transmit ring buffer read control circuit 320 to the SERDES 62 disposed in the user data path 60. In this manner, data signals are coupled between the SERDES 62 disposed in the user data path 60 and the transmit ring buffer read control circuit 320.

A control data receive interface 326 couples the BAM processor 46 to the SERDES 52 (FIG. 2) located on the control data path 50 (FIG. 2) while a BAM management controller 370 couples the BAM processor 46 to the bridge circuit 94 (FIG. 2).

The protocol specific logic circuit 44 further includes a PCI host control interface 328, which, as shown and described above in conjunction with FIG. 2, is coupled to the bridge circuit 94 (FIG. 2). The PCI host control interface 328 is adapted to provide a plurality of control signals to the bridge circuit 94 to control the bi-directional communication of data packets between the FC MAC 82 (FIG. 2) and the PCI bus interface 98 (FIG. 2), via the bridge circuit 94 (data packet communication in the FC data transfer format). Similarly, the PCI interface is also adapted to provide a plurality of control signals to the bridge circuit 94 to control the bi-directional communication of data packets between the GbE MAC 90 and the PCI bus interface 98, via the bridge circuit 94 (data packet communication in the GbE data transfer format).

When the PSLC 44 operates in a transmit mode, one or more BAMs are provided via the control data path 50 (FIG. 2) to the control data receive interface 326, as described above. The control data receive interface 326 couples the BAMs to the BAM processor 46.

In response to receipt of a first one of the one or more BAMs, BAM processor 46 communicates a first request to a BAM management controller 370. In particular, BAM processor 46 requests the BAM management controller 370 to retrieve a first group of data packets from a memory bucket (e.g. one of buckets 70*a*–70*d* in FIG. 2). The particular data packets retrieved depend upon the information specified in the BAM being processed.

Also in response to a BAM, the BAM processor 46 coordinates the transmission of the first group of data packets in a predetermined time interval or TIMESLOT, which is also scheduled by the headend controller (FIG. 1) and which is specified in the BAM being processed.

In response to receiving a request from the BAM processor 46, the BAM management controller 370 processes and forwards the request for the first group of data packets to the host processor 200 (FIG. 2), via the bridge circuit 94, PCI transfer bus 96, PCI bus interface 98 and the device driver section 100. The host processor 200 responds to receipt of the request by retrieving the first group of data packets from the storage system 210 and storing the data packets in appropriate ones of the memory buckets 70*a*–70*d* (FIG. 2).

If it is determined at the bridge circuit 94 that the first group of data packets is formulated in an FC data transmit format, the bridge circuit 94 is controlled to forward the first group of data packets in the FC data transmit format to the FC MAC receive interface 312 located on the protocol specific logic circuit 44, via the FC MAC circuit 82 (FIG. 2). On the other hand, if it is determined at the bridge circuit 94 that the first group of data packets is formulated in a GbE data transmit format, the bridge circuit 94 is controlled to forward the first group of data packets in the GbE data transmit format to the GbE MAC receive interface 310 located on the protocol specific logic unit 44, via the GbE MAC circuit 90 (FIG. 2).

The connection mapper circuit 314, receives the first group of data packets (in either the FC data transmit format or the GbE data transmit format) and provides the data packets to the transmit ring buffer write control 316. The connection mapper circuit 316 assigns one or more predetermined address locations in the transmit memory buffer 70 to the first group of data packets. In one embodiment, the connection mapper circuit 316 may assign the one or more predetermined address locations in the transmit memory buffer 70 to the first group of data packets based on the address of the NODE 22 and/or 27 for which the first group of data packets is scheduled for communication during the first TIMESLOT.

It should be understood that the data transmission format (e.g. FC or GbE) is transparent to the connection mapper circuit 366, as well as to the remaining circuits in the transmission path of the first group of data packets, which path extends to the destination NODE 22 and/or 27 for which the first group of data packets will be communicated during the scheduled first TIMESLOT. Therefore, reference to the first group of data packets can now be made without reference to the data transmission format.

The transmit ring buffer write control 316 receives the first group of data packets and interacts with the transmit SRAM controller 318 to write the first group of data packets to the one or more predetermined address locations in the transmit memory buffer 70.

It should be understood that the above described operation can be cyclically repeated in response to receipt of each of the plurality of BAMs at the BAM processor 46 to write a plurality of groups of data packets at a number of predetermined address locations in the transmit memory buffer 70. Further, the plurality of groups of data packets stored in the transmit memory buffer 70 can be scheduled by the BAM processor 46 for communication during a plurality of TIMESLOTs to a number of predetermined NODEs 22 and/or 27, as prescribed in each corresponding BAM.

The transmit ring buffer read control 320 receives one or more control signals from the BAM processor 46, to enable the transmit ring buffer read control 354 to read the first group of data packets from the transmit memory buffer 70, via the transmit SRAM controller 318, and to communicate the first group of data packets to the data transmit interface 324 during the first TIMESLOT. More specifically, during the first TIMESLOT, the transmit ring buffer read control 320 reads the first group of data packets from the transmit memory buffer 70 and communicates the first group of data packets to one or more predetermined NODEs 22 and/or 27, via the data transmit interface 324 and user data path 60 and head end controller 15 (FIG. 1).

It should be understood that the transmit ring buffer read control 320 can be controlled to successively read a plurality of groups of data packets from the transmit memory buffer 70 and to communicate the plurality of groups of data packets to one or more predetermined NODEs 22 and/or 27 during a plurality of corresponding TIMESLOTs, as prescribed in a corresponding plurality of BAMS.

Having described the preferred embodiments of the invention, it will now become apparent to one of ordinary skill in the art that other embodiments incorporating their concepts may be used. It is felt therefore that these embodiments should not be limited to disclosed embodiments.

What is claimed is:

1. A multi-protocol network interface card, comprising:
   a protocol specific logic circuit adapted to receive a plurality of instruction messages over an instruction data path and to receive and transmit a plurality of data packets in a plurality of data transfer formats over a data path;
   a first protocol controller coupled to the protocol specific logic circuit; and
   a second protocol controller coupled to the protocol specific logic circuit, wherein the protocol specific logic circuit is operable to process the plurality of data packets in the plurality of data transfer formats by defining at least a first predetermined data packet of the plurality of data packets in a first data transfer format of the plurality of data transfer formats and by communicating the first predetermined data packet in the first data transfer format to the first protocol controller and by defining at least a second predetermined data packet of the plurality of data packets in a second data transfer format of the plurality of data transfer formats and by communicating the second predetermined data packet in the second data transfer format to the second protocol controller;
   a bridge control circuit coupled to the first protocol controller, the second protocol controller and the protocol specific logic circuit, wherein the bridge control circuit is adapted to receive a plurality of control signals from the protocol specific logic circuit to control the bridge control circuit to couple the first protocol controller to a host processor or to couple the second protocol controller to the host processor; and
   a receive memory coupled to the protocol specific logic circuit and being adapted to receive the plurality of data packets in the plurality of data transfer formats from the protocol specific logic circuit at a first data rate and to communicate the plurality of data packets in the plurality of data transfer formats back to the protocol specific logic circuit at a second data rate.

2. The multi-protocol network interface card of claim 1, wherein the receive memory includes a first-in-first-out (FIFO) register.

3. The multi-protocol network interface card of claim 1, further including a transmit memory coupled to the protocol specific logic circuit and being adapted to transmit the plurality of data packets in the plurality of data transfer formats to the protocol specific logic circuit.

4. The multi-protocol network interface card of claim 3, wherein the transmit memory includes one or more dynamic-random-access-memory (DRAM) integrated circuits.

5. The multi-protocol network interface card of claim 1, wherein the protocol specific logic circuit further comprises a data receive section including:
   a data receive interface;
   a data receive controller coupled to the data receive interface, wherein the data receive controller receives at least the first predetermined data packet in the first data transfer format and at least the second predetermined data packet in the second data transfer format, via the data receive interface.

6. The multi-protocol network interface card of claim 5, wherein the data receive section further includes:
   a first protocol transmit interface coupled to the data receive controller and being adapted to receive at least the first predetermined data packet in the first data transfer format, via the data receive controller.

7. The multi-protocol network interface card of claim 6, wherein the first data transfer format includes a Fibre Channel data transfer format.

8. The multi-protocol network interface card of claim 6, wherein the data receive section further includes:
a second protocol transmit interface coupled to the data receive controller and being adapted to receive at least the second predetermined data packet in the second data transfer format, via the data receive controller.

9. The multi-protocol network interface card of claim 8, wherein the second data transfer format includes a Gigabit Ethernet data transfer format.

10. The multi-protocol network interface card of claim 6, wherein the protocol specific logic circuit further comprises a data transmission section including:
a first protocol receive interface coupled to a connection mapper circuit;
a buffer write control coupled to the connection mapper circuit;
a data transmit controller coupled to the buffer write control, wherein the data transmit controller is adapted to receive at least the first predetermined data packet in the first data transfer format, via the first protocol receive interface, the connection mapper and the buffer write control.

11. The multi-protocol network interface card of claim 10, wherein the data transmission section further includes:
a second protocol receive interface coupled to the connection mapper circuit, wherein the transmit controller is adapted to receive at least the second predetermined data packet in the second data transfer format, via the second protocol receive interface, the connection mapper and the buffer write control.

12. The system for bufferless data communications of claim 11, wherein the data transmission section further includes:
a buffer read control coupled to the data transmit controller; and
a data transmit interface coupled to the buffer read control, wherein the buffer read control is adapted to read at least the first predetermined data packet in the first data transfer format from the data transmit controller and to read at least the second predetermined data packet in the second data transfer format from the data transmit controller.

13. The multi-protocol network interface card of claim 1, wherein the first protocol controller is operable to transmit the first predetermined data packet to a storage system in the first data transfer format, and wherein the second protocol controller is operable to transmit the second predetermined data packet to the storage system in the second data transfer format.

14. The multi-protocol network interface card of claim 13, wherein the first and second controllers are operable to transmit the first and second predetermined data packets, respectively, to the storage system, via the same communication medium.

15. A processing system comprising:
a processor;
a memory coupled to the processor; and
a multi-protocol network interface card according to claim 1, coupled to the processor.

16. A multi-protocol network interface card, comprising:
a protocol specific logic circuit adapted to receive a plurality of instruction messages over an instruction data path and to receive and transmit a plurality of data packets in a plurality of data transfer formats over a data path;
a first protocol controller coupled to the protocol specific logic circuit; and
a second protocol controller coupled to the protocol specific logic circuit, wherein the protocol specific logic circuit is operable to process the plurality of data packets in the plurality of data transfer formats by defining at least a first predetermined data packet of the plurality of data packets in a first data transfer format of the plurality of data transfer formats and by communicating the first predetermined data packet in the first data transfer format to the first protocol controller and by defining at least a second predetermined data packet of the plurality of data packets in a second data transfer format of the plurality of data transfer formats and by communicating the second predetermined data packet in the second data transfer format to the second protocol controller, and wherein the protocol specific logic circuit includes a bandwidth-allocation-module (BAM) processor that is operable to receive at least a first of the plurality of instruction messages over the instruction data path and to process the first instruction message of the plurality of instruction messages by requesting at least the first predetermined data packet in the first data transfer format from a host processor and by scheduling communication of the first predetermined data packet in the first data transfer format during a first predetermined time interval; and
a bridge control circuit coupled to the first protocol controller, the second protocol controller and the protocol specific logic circuit, wherein the bridge control circuit is adapted to receive a plurality of control signals from the protocol specific logic circuit to control the bridge control circuit to couple the first protocol controller to the host processor or to couple the second protocol controller to the host processor.

17. The multi-protocol network interface card of claim 16, wherein the bandwidth-allocation-module (BAM) processor is operable to receive at least a second instruction message of the plurality of instruction messages over the instruction data path and to process the second instruction message of the plurality of instruction messages by requesting at least the second predetermined data packet in the second data transfer format from the host processor and by scheduling communication of the second predetermined data packet in the second data transfer format during a second predetermined time interval.

* * * * *

UNITED STATES PATENT AND TRADEMARK OFFICE
CERTIFICATE OF CORRECTION

PATENT NO.        : 7,239,642 B1
APPLICATION NO.   : 10/196336
DATED             : July 3, 2007
INVENTOR(S)       : Stephen R. Chinn et al.

Page 1 of 1

It is certified that error appears in the above-identified patent and that said Letters Patent is hereby corrected as shown below:

Title Page Item (60) Related U.S. Application Data: Please insert --...Non-Provisional application No. 09/994,475, filed on January 26, 2001...--.

Signed and Sealed this
Fifth Day of July, 2016

Michelle K. Lee
*Director of the United States Patent and Trademark Office*